May 10, 1949.  J. P. BAUTERS  2,469,944
SIGNALING DEVICE FOR CYCLES AND THE LIKE
Filed Aug. 13, 1947  2 Sheets-Sheet 1
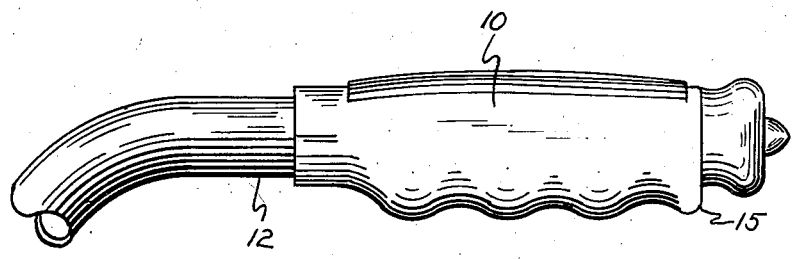
Fig 1
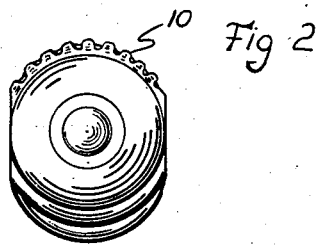
Fig 2
Fig 3
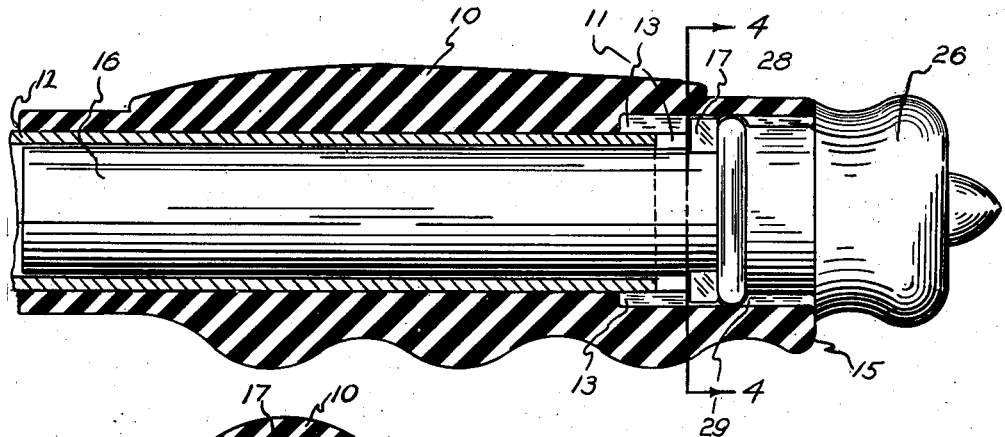
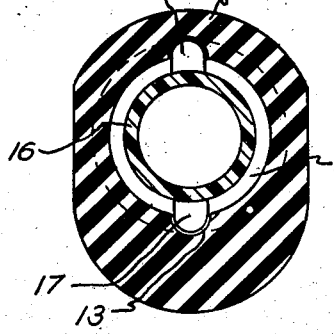
Fig 4
INVENTOR.
JOSEPH PHILIP BAUTERS
BY John F Brezina

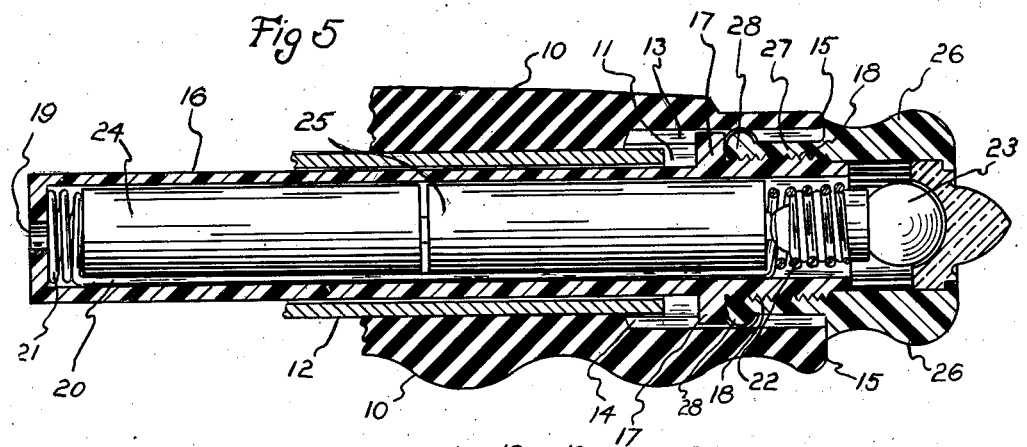
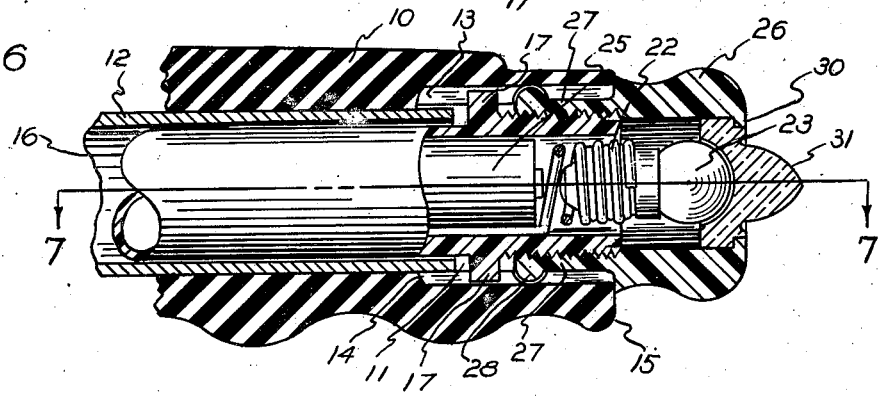
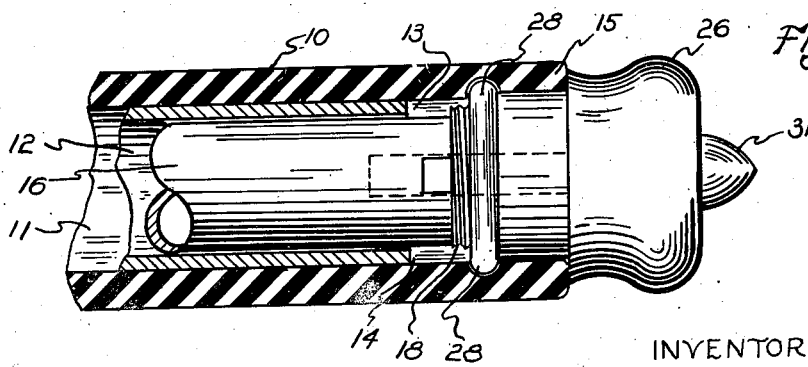

Patented May 10, 1949

2,469,944

UNITED STATES PATENT OFFICE 2,469,944

SIGNALING DEVICE FOR CYCLES AND THE LIKE

Joseph Philip Bauters, Chicago, Ill.

Application August 13, 1947, Serial No. 768,331

6 Claims. (Cl. 177—329)

This invention relates to manually operable and controllable signalling devices particularly adapted for use on or in connection with bicycles or the like.

It is an important object of my invention to provide a signalling device adapted to be quickly and easily mounted upon one or both of the tubular handle bars of the bicycle or related vehicle, having an elongated battery cell container, light globe and circuit means and a movable or rotatable grippable head which when partially rotated in one direction will cause a closing of the circuit and ignite the light element, and which when moved in another direction will open such circuit and de-energize the light.

Further advantages and accomplishments of my invention are the provision of a portable signalling and lighting means adapted to be mounted on cycles or the like of the afore-described class, having a battery casing removably mounted within a grippable handle or shell, said casing being normally secured and mounted during normal uses, and having a rotatable head upon its outer end which houses a light globe connected in circuit with battery means within the casing, and having means providing for normal rotation of such head to turn the light on or off together with means permitting selective removal of such so that it may be used as a separate portable lighting unit, that is, as a flashlight.

It is known that bicycles which generally have no signalling means visible from the rear have caused numerous accidents and property damage. This has been one of the hazards to cyclists which in many instances have prevented their use in metropolitan areas after dark. My invention provides a novel battery powered lighting and signalling means optionally adapted to be mounted at or adjacent the end of one or both handle bars of a cycle which means also provides a convenient handle and grip for the operator, as well as a portable hand light when disassembled, one advantage of the operator having the hand partly upon a part of the movable head of such signalling means most of the time, thereby facilitating and making easy the turning on and off of such signalling means. My novel signalling means has the added function of providing grips or handles and the further novel advantage of being easily selectively controllable at all times as well as visible from the rear and also from the sides to pedestrians or vehicle operators approaching at angles to the path of the cycle.

Other and further important objects of the invention will be apparent from the following description and appended claims.

This invention (in a preferred form) is illustrated in the accompanying drawings and described in the following specification having numerals of reference referred to in the drawings.

On the drawings:

Fig. 1 is a side elevation of my signalling device illustrating its mounting of a fragment of a handle bar.

Fig. 2 is a rear end elevation thereof.

Fig. 3 is an enlarged partially cross sectional view taken on a longitudinal plane therethrough.

Fig. 4 is a cross sectional view taken on line 4—4 of Fig. 3.

Fig. 5 is a partially cross sectional view taken on a plane longitudinally of the device, and with parts in elevation, and illustrating the position of parts with the circuit closed.

Fig. 6 is a cross sectional view with parts broken away and illustrating the globe socket out of contact with a battery terminal.

Fig. 7 is an enlarged partially cross section view of the rear portion of the signalling device showing parts in elevation.

Referring to the drawings, numeral 10 designates an elongated longitudinally passaged tube-like grip or container whose forward end portion is preferably reduced as indicated in Fig. 3 and whose intermediate portion is relatively thicker and preferably corrugated along its lower portion as illustrated in Figs. 1 and 2.

The central passage through handle or container 10 at its rear portion is preferably enlarged to provide an elongated space, chamber or compartment 11 as illustrated in Figs. 3 and 4. Numeral 12 designates a fragment of a handle bar such as found on bicycles. The rear portion of said grip has formed therein on diametrically opposite sides of the chamber 11 a pair of slots or recesses 13 and 14 which open inwardly and terminate at the rear periphery 15 of grippable casing 10.

A cylindrical container shell or casing 16 having a pair of diametrically opposite outwardly projecting lugs or extensions 17 is removably mounted within slots or recesses 13 and 14 respectively so that said lugs prevent rotation of said casing 16 though permit removal longitudinally as hereinafter described and said lugs slide in said recesses during longitudinal movement of casing 16. Said shell or casing 16 is preferably made of non-conductive material such as plastic. The rear end portion of said battery casing 16 has external threads 18 which cooperate with threads of the head hereinafter described. Said casing 16 is preferably of a size to hold two small batteries of a standard size and exteriorly it will fit within a standard handle bar. The inner or forward end of said casing 16 preferably has an opening or aperture 19 therein to provide for insertion of a sharp object to and in pushing out batteries 24 and 25 or the same become stuck in the casing through swelling and the like.

Numeral 20 designates a metal contact wire or bar whose end adjacent aperture 19 terminates in a compressible spring 21 and whose opposite or rear end terminates in a spiral socket and globe mounting member or spring 22, as shown at right of Figs. 5 and 6. A standard light globe 23 is removably threaded into the convolutions forming member or socket 22.

Numeral 26 is a tubular and annular member and head preferably formed of plastic or other mouldable material. The inner portion of said head is preferably reduced and provides an internally threaded flange 27 which terminates in an integral annular flange, ridge or bead 28 which in turn normally seats in an inwardly opening annular groove or recess 29 formed in the rear end portion of grip 10 as illustrated in Figs. 7, 5 and 6. The engagement of said flange 28 with recess 29 prevents accidental removal of the head in normal uses.

When the head 26 is rotated counterclockwise a sufficient distance the two lugs 17 meet or engage the edge of the handle bar, whereupon the inward movement of the case 16 stops. As such counter-clockwise movement is continued beyond the point of said engagements the cap or head 26 will, on such continued rotary cause a gradual slipping out and disengagement of flange 28 from the annual recess 29 in which it is normally seated. When the point has been reached, when the said flange has been withdrawn from its seat, a manual pull on cap 26 will pull out the case 16 and contained parts along with head 26. Thereafter the user, having the lighting unit in his hands (separated from the grip), may rotate the head 26 in clockwise rotation to cause an inward movement of the light bulb until the socket thereof contacts the battery terminal and closes the circuit to produce a portable hand light.

Due to the elasticity and yieldability of the material from which the grip 10 is made such a manual direct pull on the head as aforesaid will permit removal of the case and head as described and likewise replacement thereof. Such elasticity permits replacement in the described manner.

The opposite and outer end of the lens mounting head 26 is preferably provided with an integral inwardly extending annular flange 30 which acts to retain in place a recessed light transparent reflector 31 which is preferably made of glass or plastic and whose main portion fits within the head 26 as illustrated in Figs. 5 and 6.

It will be understood that whenever the cyclist desires, for example, in cases of need, he may remove my device from the handle bar and use it as a portable flashlight selectively turning the same on and off in the described manner.

This invention has been described herewith more or less precisely as to details of one illustrative embodiment, and it is understood that the invention is not limited thereto as the parts may be rearranged or equipped variously without departing from the spirit or scope of the invention.

I claim:

1. In a signalling device, an elongated non-conductive casing mountable in a cycle handle bar, said casing being externally threaded at one end, said casing being adapted to hold batteries therein, said casing having outwardly projecting studs on one end thereof; a grippable handle having inwardly opening grooves therein, said studs normally extending into certain of said grooves; a cap threaded on said casing at the threaded end thereof and adapted to have a light bulb mounted therein, and means for yieldably mounting said bulb in said cap, said cap providing an opening the rotation of said cap being adapted to move said bulb into and out of contact with said batteries.

2. In a signalling device for cycles, an elongated non-conductive casing partly mountable in a handle bar, the projecting portion thereof being externally threaded, said casing being adapted to hold batteries therein; projecting studs on the outer projecting portion of said casing; a grippable tubular handle having longitudinal grooves and an inner annular groove therein, an annular head having one end portion threaded on said casing and having an annular flange normally seating in said annular groove of said handle; a light bulb within said head, said head being provided with an opening and means for movably mounting said bulb in said head; and circuit means adapted to permit connection of said bulb with the batteries in said casing, the rotation of said head being adapted to open or close said circuit means.

3. In a signaling device for cycles, an elongated grippable member adapted to be partially mounted about the end of a handle bar; an elongated passaged non-conductive battery casing within said grippable member, said casing having projections removably engaging the end portion of said member, said casing being adapted to partially lie within said handle bar; a passaged head threadingly mounted on the end of said casing; a translucent lens in said head; and spring means in said casing adapted to removably mount a light globe and having a wire adapted to connect same to the rear end of a battery; the rotation of said head in one direction being adapted to move said casing longitudinally and outwardly to cause contact of the light globe with the central terminal of a battery, the reverse rotation of said head being adapted to open said contact and open the battery circuit.

4. In a signaling device for cycles, an elongated grippable member adapted to be partially mounted about the end of a handle bar; an elongated passaged non-conductive battery casing within said grippable member, said casing being movable longitudinally within said grippable member, said casing being adapted to partially lie within said handle bar a passaged head threadingly mounted on the end of said casing; a lens in said head; spring means in said casing adapted to removably mount a light globe, and a wire adapted to connect a light globe to the rear end of a battery circuit; the rotation of said head in one direction being adapted to move said casing outwardly to cause contact of the light globe with the central terminal of a battery, the reverse rotation of said head being adapted to open said contact and open the battery circuit.

5. In a signaling device for cycles, an elongated grippable member adapted to be partially mounted on the end of a handle bar; an elongated passaged non-conductive battery container within said grippable member, said container having projections removably and slidably engaging the end portion of said grippable member, a passaged head threadingly mounted on the end of said casing, said head having a flange normally seating and rotatable in the groove of said member; a translucent lens in said head; spring means in said casing adapted to removably mount a light globe and a wire adapted to connect said spring means to the rear end of a battery; the rotation of said head in one direction being adapted to move said casing longitudinally to close the circuit to the battery, the reverse rotation of said head being adapted to open the battery circuit.

6. In a signaling device an elongated tubular non-conductive casing, said casing having external threads at one end thereof; a pair of projecting studs on said casing; said casing being adapted to hold batteries therein; a yieldable spring-like socket in said casing adapted to receive a light globe; a circuit wire adapted to connect said socket with the battery terminal at the opposite end of said casing; a flanged head adapted to permit seeing of a light therein and rotatably threaded on the threads of said casing, the rotation of said head being adapted to press a light globe inwardly to cause such globe to contact the central terminal of a battery and to close the battery circuit.

JOSEPH PHILIP BAUTERS.

REFERENCES CITED

The following references are of record in the file of this patent:

UNITED STATES PATENTS

| Number | Name | Date |
| --- | --- | --- |
| 2,416,160 | Davidson | Feb. 18, 1947 |

FOREIGN PATENTS

| Number | Country | Date |
| --- | --- | --- |
| 147,667 | Austria | Nov. 10, 1936 |
| 165,014 | Switzerland | Jan. 2, 1934 |